(12) United States Patent
Koch

(10) Patent No.: US 7,980,620 B2
(45) Date of Patent: Jul. 19, 2011

(54) HARDTOP FOLDING ROOF FOR AN OPEN MOTOR VEHICLE

(75) Inventor: Michael Koch, Boeblingen (DE)

(73) Assignee: Daimler AG, Stuttgart (DE)

( * ) Notice: Subject to any disclaimer, the term of this patent is extended or adjusted under 35 U.S.C. 154(b) by 187 days.

(21) Appl. No.: 12/296,409

(22) PCT Filed: Apr. 2, 2007

(86) PCT No.: PCT/EP2007/002930
§ 371 (c)(1),
(2), (4) Date: Feb. 5, 2009

(87) PCT Pub. No.: WO2007/115714
PCT Pub. Date: Oct. 18, 2007

(65) Prior Publication Data
US 2009/0174218 A1  Jul. 9, 2009

(30) Foreign Application Priority Data

Apr. 7, 2006 (DE) .......................... 10 2006 016 486

(51) Int. Cl.
*B60J 7/12* (2006.01)
(52) U.S. Cl. ............................. 296/107.17; 296/146.14
(58) Field of Classification Search ............. 296/107.07, 296/107.09, 107.16, 107.17, 107.18, 108, 296/146.14, 146.16
See application file for complete search history.

(56) References Cited

U.S. PATENT DOCUMENTS

| 3,214,213 | A | * | 10/1965 | Hezler, Jr. et al. | 160/37 |
| 3,521,403 | A | * | 7/1970 | Bouwkamp | 49/324 |
| 4,543,747 | A | * | 10/1985 | Kaltz et al. | 49/249 |
| 5,195,798 | A | * | 3/1993 | Klein et al. | 296/146.14 |
| 5,746,470 | A | | 5/1998 | Seel et al. | |
| 5,988,729 | A | * | 11/1999 | Klein | 296/107.15 |
| 6,123,381 | A | | 9/2000 | Schenk | |
| 6,382,703 | B1 | * | 5/2002 | Queveau et al. | 296/107.17 |
| 6,419,296 | B2 | * | 7/2002 | Dintner et al. | 296/107.18 |

(Continued)

FOREIGN PATENT DOCUMENTS

DE 44 45 580 C1 12/1995
DE 197 51 660 C1 3/1999

OTHER PUBLICATIONS

International Search Report w/English translation of relevant portion (three (3) pages).
PCT/ISA/237 including English translation (seven (7) pages).

*Primary Examiner* — Glenn Dayoan
*Assistant Examiner* — Pinel E Romain
(74) *Attorney, Agent, or Firm* — Crowell & Moring LLP

(57) ABSTRACT

A hardtop folding roof for an open motor vehicle includes an upper roof part and a rear roof part having a rear window. The roof parts can be transferred from a closed position into a storage position via respective lateral link mechanisms. Each link mechanism includes two main links. A first main link is assigned to an associated roof pillar of the rear roof part, and a second main link is coupled at least indirectly to the upper roof part at a distance in front of the associated first main link. A rear window holder of the rear window can be moved relative to the roof pillars during the transfer of the folding roof, and the second main links of each link mechanism are assigned to the rear window holder of the rear window.

14 Claims, 3 Drawing Sheets

U.S. PATENT DOCUMENTS

| | | | |
|---|---|---|---|
| 6,474,731 B2 * | 11/2002 | De Gaillard | 296/220.01 |
| 6,676,192 B2 * | 1/2004 | Marold et al. | 296/107.19 |
| 6,702,362 B2 * | 3/2004 | Eichholz et al. | 296/108 |
| 6,827,392 B2 * | 12/2004 | Doncov et al. | 296/147 |
| 6,945,590 B2 * | 9/2005 | Doncov et al. | 296/147 |
| 7,284,783 B2 * | 10/2007 | Mori et al. | 296/108 |
| 7,784,849 B2 * | 8/2010 | Westermann et al. | 296/107.17 |
| 7,832,784 B2 * | 11/2010 | Cimatti et al. | 296/107.09 |
| 2001/0033089 A1 * | 10/2001 | Maass | 296/107.07 |
| 2008/0203758 A1 * | 8/2008 | Brockhoff | 296/107.07 |

* cited by examiner

HARDTOP FOLDING ROOF FOR AN OPEN MOTOR VEHICLE

BACKGROUND AND SUMMARY OF THE INVENTION

This invention relates to a hardtop folding roof for an open motor vehicle.

A hardtop folding roof of this type is known from German document DE 197 51 660 C1, in which an upper, intrinsically rigid roof part and a rear roof part, comprising a rear window, can be transferred from a closed position into a storage position within a roof storage space of the motor vehicle via respective link mechanisms arranged at the sides of the motor vehicle. Each of the two lateral link mechanisms comprises two main links, of which, in each case, a first, rear main link is assigned to the associated roof pillar of the rear roof part or is connected fixedly thereto, and a respective second main link is coupled indirectly to the upper roof part at a distance from the associated first main link. The two respective main links are indirectly coupled to the upper roof part via a hinge arm, which is designed as an intermediate link and, for its part, is connected fixedly to the upper roof part. At their ends facing away from the intermediate link, the two main links of each link mechanism are mounted on the vehicle body at a distance one behind the other. Accordingly, the two main links and the intermediate link of each link mechanism form a parallelogram linkage via which the upper and rear roof parts can be transferred from the closed position into the storage position. During the transfer of the folding roof, a rear window holder of the rear window is moved about a center axis, which runs in the transverse direction of the vehicle, relative to the roof pillars such that the rear window holder, in the storage position, comes to lie in a manner curved in the same direction as the upper roof part.

A rear window that rotates during transfer of the folding roof therefore makes it possible, when the folding roof is folded away—for example in contrast to the known arrangement of German document DE 44 45 580 C1—for the useable storage space of the roof storage space, which is designed as a trunk compartment, to be considerably enlarged. However, rotation of the rear window during the transfer of the folding roof between the closed position and the storage position requires a considerable mechanical outlay. Furthermore, relatively extensive measures have to be taken in order to seal off the rotating window from the rear and upper roof parts in the closed position.

It is therefore the object of the present invention to provide a hardtop folding roof that is constructed more simply while maintaining a space-saving arrangement in its storage position.

This object is achieved by a hardtop folding roof according to the invention. Advantageous refinements, with expedient and nontrivial developments, are claimed.

In a hardtop folding roof according to the invention, the second main links of each link mechanism are assigned to the rear window holder of the rear window. In other words, according to the invention, the function of the second main links, which are coupled at least indirectly to the upper roof part at a distance in front of the associated first main link, is taken over by the rear window holder of the rear window, which can be moved separately from the roof pillars of the rear roof part during the transfer of the folding roof. The present hardtop folding roof, therefore, no longer comprises separate second main links; instead, the latter are part of the rear window holder with which the rear window can be moved or shifted in relation to the roof pillars of the rear roof part during the movement of the folding roof between the closed position and the storage position. In this case, the second main links of the rear window holder together with the associated first main links of each link mechanism form a parallelogram arrangement, with the respective first and second main links being at a corresponding distance from each other both at their upper coupling points in the region of the upper roof part and at their lower coupling points in the region of the body of the motor vehicle.

Since the rear window holder is arranged via the two second main links at a distance in front of the respective coupling points of the first main links, which coupling points form the actual hinge pin between the upper roof part and the roof pillars of the rear roof part, the rear window, in the storage position of the folding roof, comes to lie offset forward in the longitudinal direction of the vehicle by a corresponding length offset in relation to the upper roof part and the roof pillars of the rear roof part. In contrast, for example, to the prior art according to German document DE 44 45 580 C1, the upper roof part and the rear window therefore do not lie with opposite curvatures directly one above the other, but rather lie offset with respect to each other by a certain length in the longitudinal direction of the vehicle. By means of this length offset, it is possible to arrange the upper roof part and the oppositely curved rear window much closer or tighter to one another in the storage position of the folding roof such that the upper roof part and the rear window can be folded compactly in relation to each other in a manner similar to the arrangement forming the subject matter of German document DE 197 51 660 C1.

The extremely compact arrangement of the upper roof part in relation to the rear window in the storage position of the folding roof is achieved here in a simple manner by the second main links of the rear window holder being coupled at least indirectly to the upper roof part at a distance in front of the respectively associated first main link. Furthermore, the arrangement according to the invention results in the further advantage that the roof pillars of the rear roof part can be designed to be significantly narrower, or the rear window itself can be designed to be significantly wider, since, in contrast to the known prior art, the second main links no longer have to be covered by the front end regions of the roof pillars.

A further advantage of the hardtop folding roof according to the invention is that the rear window holder or the rear window can be sealed off from the adjacent roof pillars of the rear roof part and from the upper roof part in a simple manner.

A particularly simple rear window holder can be provided if the second main links on both sides of the motor vehicle laterally bound or border the rear window. Furthermore, the rear window can be designed to be particularly wide, with the two second main links serving both to border the rear window and to control the movement of the rear window during the transfer between the closed position and the storage position. A particularly stiff and stable rear window holder can be achieved if the two main links are connected to each other via at least one transverse connection.

A particularly simple design of the rear window holder can furthermore be achieved when the second main links protrude with a respective upper link arm in relation to the upper end of the rear window as far as the coupling points to the upper roof part.

In the storage position of the folding roof, to achieve a sufficient length offset in the longitudinal direction of the vehicle between the upper roof part and the rear window, it has proven advantageous, in a further refinement of the invention, to have the second main links coupled by their respective upper link arm at least indirectly to the upper roof part at a considerable distance in front of a rear end edge of the upper roof part. Such a considerable length offset in the storage position of the folding roof makes it possible to deposit the upper roof part in the oppositely curved rear window in the roof storage space appropriately closely or tightly.

A particularly stable folding mechanism of the folding roof can be provided if the rear window holder is designed as a rear window frame, with the second main links being connected to each other at the upper and lower ends of the rear window via a respective transverse connection. In this case, it has proven advantageous when the two second main links and at least the upper transverse connection engage around the rear window in the manner of a frame and therefore reliably secure it in its position.

In a further refinement of the invention, a particularly convenient folding roof is configured so that, when the folding roof is closed, the rear window is designed to be height-adjustable and/or openable along the rear window frame. This creates an additional ventilation option for the interior of the open motor vehicle when the folding roof is closed, contributing to the overall sporty concept of the open motor vehicle. An adjusting drive for height adjustment and/or for opening the rear window is advantageously arranged such that it is at least substantially concealed in the region of, and preferably within, the rear window frame.

A particularly stable arrangement of the rear window frame or of the entire folding roof on the motor vehicle can be achieved by the lower transverse connection having a transverse element which, at the rear, adjoins a transverse support on the upper side of a partition of the motor vehicle. Furthermore, the transverse element together with the transverse support of the partition can form a supporting arrangement for a rear parcel shelf via which the interior of the motor vehicle is divided off from the roof storage space located behind it when the folding roof is closed.

A particularly space-saving arrangement with a correspondingly large length offset in the longitudinal direction of the vehicle between the upper roof part and the rear window can be provided if, in its storage position, the rear window frame comes to lie with its lower or front end in the vicinity of the transverse support of the partition.

A particularly simple sealing of the rear window frame toward the outside can be provided by means of an encircling seal with which it can be sealed off from the upper roof part and the roof pillars of the rear roof part. The rear window frame, in other words, can accordingly be acted upon toward the outside with a sealing force when the folding roof is closed such that the rear window is securely sealed off from the adjacent components of the folding roof in a simple manner.

Furthermore, a particularly space-saving arrangement of the folding roof in the storage position can be achieved if, in its storage position, the rear window comes to lie above a fuel tank of the motor vehicle.

Finally, the hardtop folding roof can be designed in a particularly simple manner as a premanufactureable constructional unit if each of the two lateral link mechanisms comprises a main bearing via which the respectively associated first and second main links are mounted pivotably on the body of the open motor vehicle. In this way, it is possible to fasten the folding roof to the body of the open motor vehicle in a simple manner essentially by connecting the two main bearings correspondingly to the load-bearing components of the motor vehicle.

Further advantages, features and details of the invention emerge from the description below of a preferred exemplary embodiment and with reference to the drawings.

DETAILED DESCRIPTION OF THE INVENTION

Figure 1:
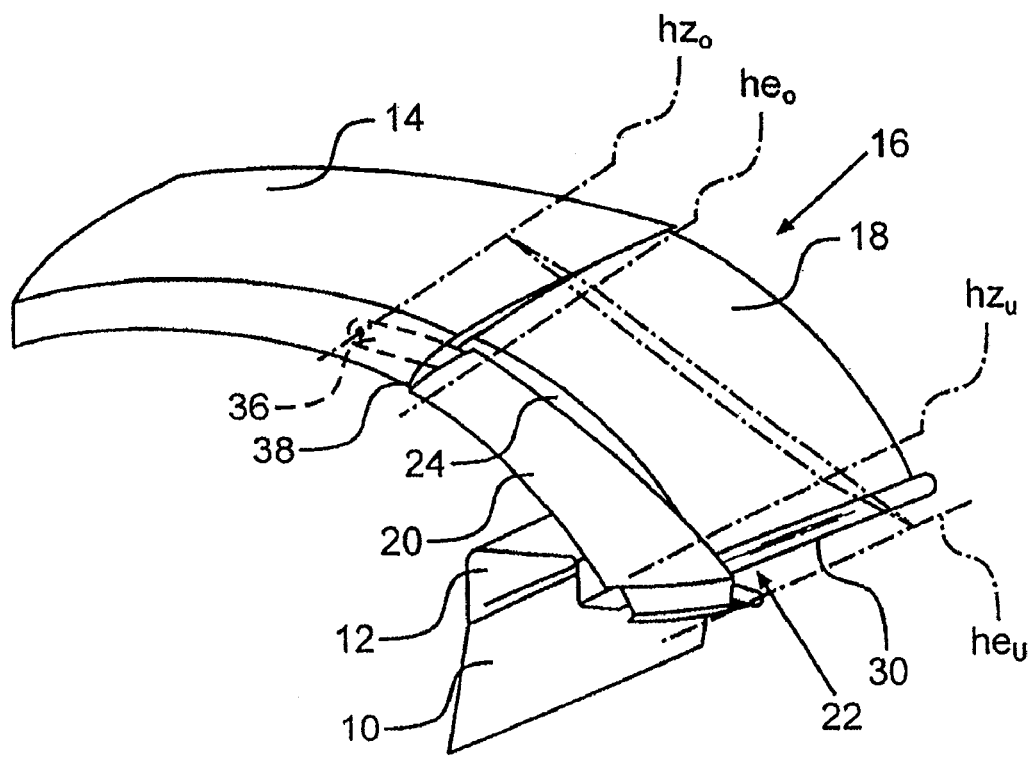
FIG. 1 is a schematic perspective view of a hardtop folding roof for an open motor vehicle (which otherwise cannot be seen further) that essentially has an upper roof part and a rear roof part, comprising two lateral roof pillars and a rear window arranged in-between, the roof parts being illustrated here in their closed position covering the interior of the motor vehicle.

FIG. 1 illustrates, in a schematic perspective view, obliquely from the left rear, a hardtop folding roof for an open motor vehicle, of which only a rear partition 10, which bounds the interior of the motor vehicle to the rear and on the top side of which a transverse support 12 running in the transverse direction of the vehicle is arranged, can be seen. In this case, the partition 10 and the transverse support 12 arranged on the upper side extend at the rear end of the passenger cell over the entire width of the vehicle as far as side walls (not illustrated) of the motor vehicle which is designed, for example, as a two-seater roadster. The hardtop folding roof comprises an upper roof part 14, which adjoins a windshield frame (not illustrated), and a rear roof part 16, which adjoins the upper roof part and is substantially formed from a rear window 18 and roof pillars 20 laterally bounding the latter. In the present exemplary embodiment, the upper roof part 14 is designed as an intrinsically rigid shell element, for example made of metal sheet or plastic. It would likewise also be conceivable to design the upper roof part 14 substantially as a glass element or the like. The roof pillars 20 of the rear roof part 16 are likewise produced from a metal sheet or from plastic. The rear window 18 can be produced from a safety glass or from a correspondingly transparent plastic.

Figure 2:
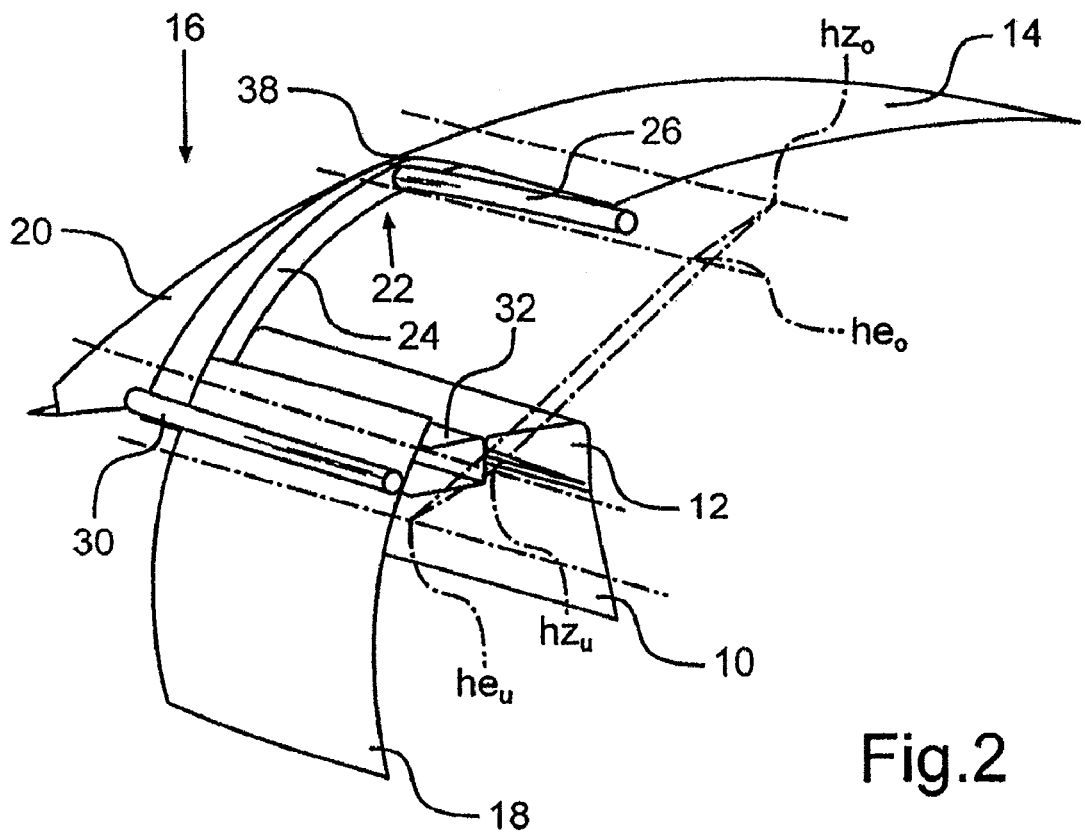
FIG. 2 is a schematic and perspective sectional view through the hardtop folding roof along a sectional plane running vertically and in the longitudinal direction of the vehicle, the rear window being held by a rear window frame and, when the folding roof is closed, being height-adjustable from a closed position into an open position, which is illustrated here.

Looking at FIG. 2, which illustrates the hardtop folding roof according to FIG. 1 obliquely from the rear right in a perspective and schematic sectional view along a sectional plane running vertically in the longitudinal direction of the vehicle, it can be seen that the rear window 18 is held by a rear window holder in the form of a rear window frame 22. The rear window frame 22 substantially comprises two lateral second main links 24, of which only the left main link 24 can be seen in FIG. 2. The two main links 24 are connected to each other at the upper and lower ends of the rear window 18 via respective transverse connections 26, 28, thereby resulting overall in a substantially rectangular border for the rear window 18. In the present exemplary embodiment, the upper transverse connection 26 at the upper end of the rear window 18 is designed as a profiled tube. Of course, it would likewise also be conceivable to use a differently designed upper transverse connection 26. The lower transverse connection 28 likewise comprises a profiled tube 30 which—as viewed in the longitudinal direction of the vehicle—is arranged behind the rear window 18 and connects the two second main links 24 to each other in a stable manner. Furthermore, the lower transverse connection 28 comprises a transverse element 32 which, in the present exemplary embodiment, is designed as a box-shaped support. In the closed position (illustrated here) of the hardtop folding roof, the transverse element 32 ends upward at the upper side of the partition 10 approximately level with the transverse support 12 arranged in front of it. Together with the transverse support 12, the transverse element 32 forms a supporting arrangement for a rear parcel shelf in the closed position of the folding roof.

As can be seen from FIG. 2, when the folding roof is in the closed position, the rear window 18 can be transferred from a closed position illustrated in FIG. 1 into an open position illustrated in FIG. 2. In this case, the second main links 24 arranged at the sides of the rear window 18 serve as lateral guide rails by means of which the rear window 18 is guided or held. For the height adjustment and/or for the opening of the rear window 18, an adjusting drive is arranged in a concealed manner, preferably within the rear window frame 22. In this case, the rear window 18 can preferably be brought into any desired open position between the completely closed position and the fully open position. For this purpose, a corresponding clearance is provided below the rear window 18, into which clearance the rear window 18 can be lowered. This clearance is preferably situated behind a fuel tank (not illustrated) which, for its part, is arranged to the rear of the partition 10.

Figure 3:
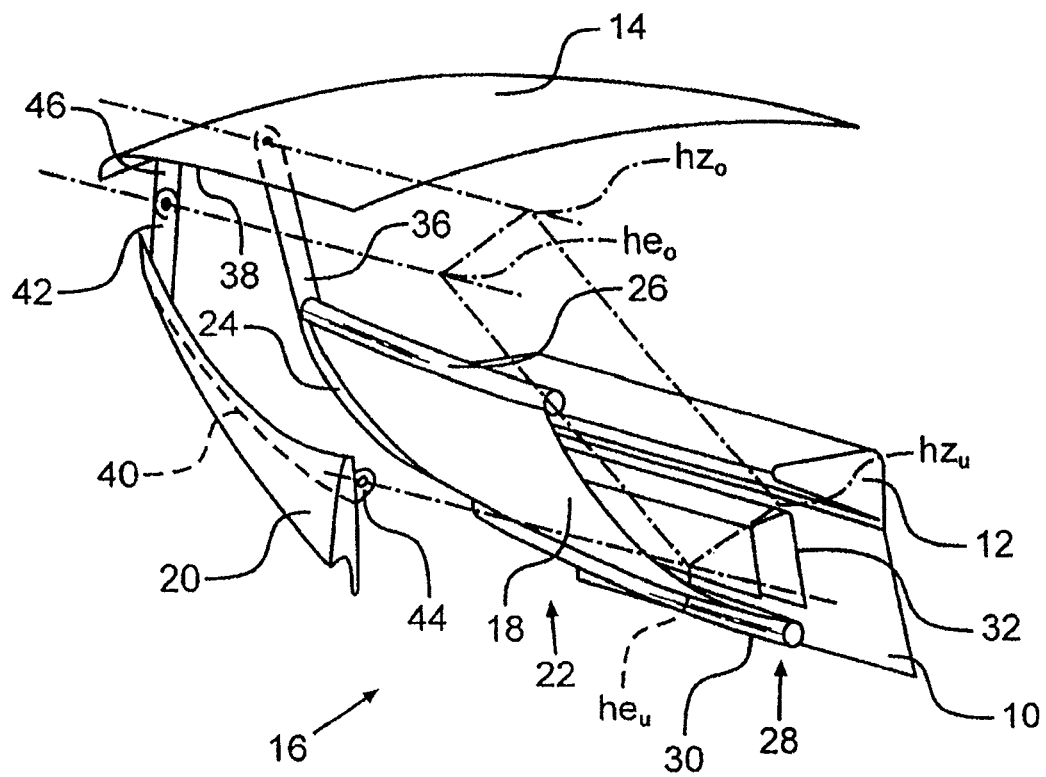
FIG. 3 is a schematic and perspective sectional view of the folding roof, which is again illustrated sectioned along a vertical sectional plane running in the longitudinal direction of the vehicle and is shown in the course of its opening movement from the closed position illustrated in FIGS. 1 and 2.
Figure 4:
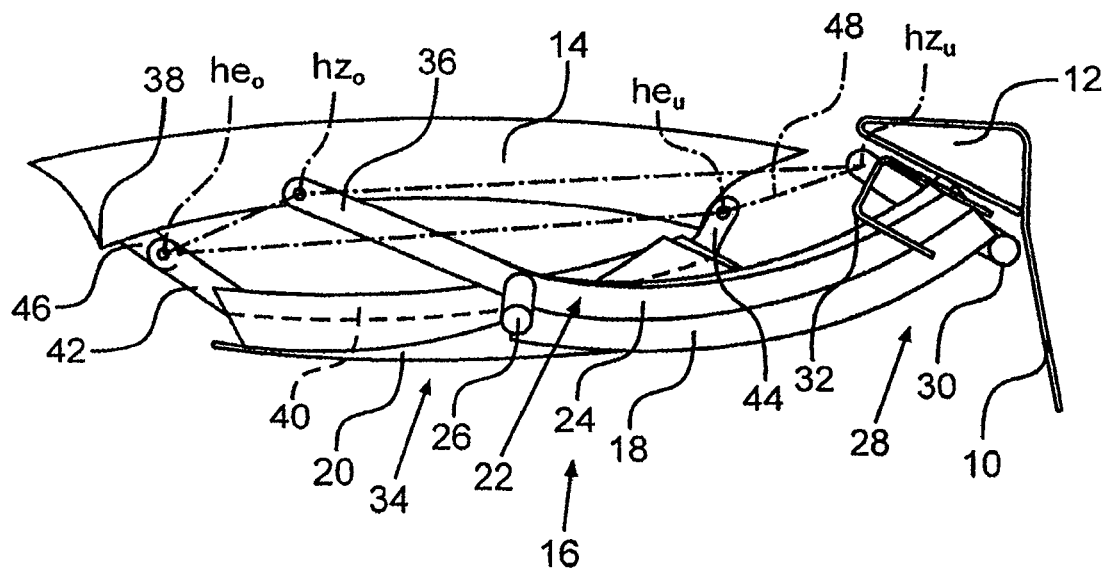
FIG. 4 is a schematic side view of the folding roof according to FIGS. 1 to 3, the folding roof having been transferred completely into its storage position.

FIG. 3 illustrates, in a schematic and perspective sectional view along a sectional plane running vertically and in the longitudinal direction of the vehicle, the hardtop folding roof obliquely from the rear right in an intermediate position which it passes through as it is transferred from the closed position illustrated in FIGS. 1 and 2 into the storage position illustrated in FIG. 4. Accordingly, FIG. 4 illustrates the hardtop folding roof in a schematic side view from the right outer side, in which the hardtop folding roof lies in a rear storage space or trunk compartment (not illustrated) of the motor vehicle. With reference to FIG. 4, in which a right, lateral link mechanism 34 can be seen, which link mechanism is arranged on the right outer side of the motor vehicle, the basic operation of the hardtop folding roof during the transfer from the closed position into the storage position illustrated here—and back—is now to be explained. The second main link 24 protrudes in a raised manner with an upper link arm 36 in relation to the transverse connection 26 arranged at the upper end of the rear window 18 and, in the present case, is indirectly or directly connected in an articulated manner to the upper roof part 14 in the region of an upper coupling point $hz_o$. In this case, it can be seen, particularly from FIG. 4, that the corresponding second main link 24 is coupled by its upper link arm 36—as viewed in the longitudinal direction of the vehicle—at a considerable distance in front of a rear end edge 38 of the upper roof part 14. At its lower end, the second main link 24 is mounted pivotably in the region of a lower coupling point $hz_u$ such that it is fixed relative to the body of the motor vehicle and to the transverse support 12 of the partition 10.

In addition to the second main link 24, each of the two lateral link mechanisms 34 comprises a first main link 40, which is assigned to the respectively associated roof pillar 20 of the rear roof part 16. The first main link 40 can be designed as a continuous link, which is connected fixedly to the respective roof pillar 20 of the rear roof part 16. It would likewise also be conceivable for the first main link 40 of each roof pillar 20 to be formed at least in some sections by the latter itself. In this case, it would be conceivable for the respectively upper and lower ends 42, 44 to be connected to each other by the associated roof pillar 20. However, in the present exemplary embodiment, the first main link 40 extends over the entire length of the associated roof pillar 20, with the upper and lower ends 42, 44 of the main link being visible. In the region of an upper coupling point $he_o$, the upper end 42 of the first main link 40 is connected pivotably to the upper roof part 14. For this purpose, the upper roof part 14 comprises an associated hinge arm 46 which interacts with the upper end 42 of the first main link 40. At its lower end, the first main link 40 is mounted on the vehicle body in the region of a lower coupling point $he_u$. An intermediate link, which, for its part, is connected fixedly to the upper roof part 14, can also be provided between the respective upper coupling points $he_o$, $hz_o$ of the first and second main links 24, 40. This would correspond to the configuration of the folding roof according to German documents DE 197 51 660 C1 and DE 44 45 580 C1. However, in the present case, the two main links 24, 40 of each link mechanism 34 are coupled directly to the upper roof part 14.

It can therefore be seen from FIG. 4 that the two upper coupling points $he_o$, $hz_o$ and the two lower coupling points $he_u$, $hz_u$ of the two main links 24, 40 create a substantially parallelogram-like link mechanism 34 via which the hardtop folding roof can be transferred between the closed position and the storage position. In the present exemplary embodiment, the two lower coupling points $he_u$, $hz_u$ of the two main links 24, 40, which are respectively assigned to each other, of each link mechanism 34 are formed at a main bearing indicated symbolically by the chain-dotted line 48. In other words, the mutually associated main links 24, 40 can be fixed via a respective common main bearing (line 48) to the body of the motor vehicle, for example to the transverse support 12 of the partition 10. Accordingly, the position of the two lower coupling points $he_u$, $hz_u$ remains unchanged irrespective of the position of the hardtop folding roof.

Looking at FIGS. 1, 3 and 4, the operation of the respective lateral region of the link mechanisms 34, which are arranged on the outer side of the motor vehicle and are indicated by chain-dotted lines, can be seen. In particular, it can be seen that the respective rear, first main link 40 is arranged substantially to the rear or below the associated second main link 24. While the first main link 40 is connected fixedly to the associated roof pillar 20 or is possibly formed at least in some sections by the latter itself, the respectively associated second main link 24 can move relative to the roof pillars 20, and therefore also relative to the first main link 40, during the transfer of the folding roof from the closed position into the storage position and back. It can be seen from FIGS. 3 and 4 that the respective second main links 24 of the rear window frame 22 are coupled to the upper roof part 14 at a considerable distance in front of the rear end edge 38. As can be seen from FIG. 4, the upper roof part 14 and the roof pillars 20 of the rear roof part 16 accordingly come to lie with their front ends at a considerable distance behind the front end of the rear window 18 in the storage position of the folding roof, with the rear window 18 or its rear window frame 22 itself coming to lie in the vicinity of the transverse support 20 of the partition 10.

Accordingly, as can be seen from FIG. 4, the upper roof part 14 and the oppositely curved rear window 18 come to lie offset with respect to each other—as viewed in the longitudinal direction of the vehicle—within the roof storage space. Accordingly, the rear or upper end of the rear window 18 or of the rear window frame 22 can come to lie extremely close to the upper roof part 14 while, conversely, the front end of the upper roof part 14 comes to lie extremely close to the central region of the rear window 18. In this way, it is possible overall to arrange the upper roof part 14 and the rear window 18 extremely compactly with respect to each other. The arrangement of the upper roof part 14 and of the rear window 18 or of the rear window frame 22 in an offset manner, as seen in the longitudinal direction of the vehicle, arises because the second main links 24 are an integral part of the rear window frame 22 and are coupled to the upper roof part 14 at a considerable distance in front of the rear end edge 38.

In order to drive the two lateral link mechanisms 34, it is possible, for example, for each main link 24, 40 of each of the two link mechanisms 34 to be pivotally driven by a hydraulic cylinder, pneumatic cylinder, an electric actuator or the like. Accordingly, the other respective main link 24, 40 of each link mechanism 34 is correspondingly moved at the same time, as a result of which the folding roof can be moved between the closed position and the storage position.

Figure 5:
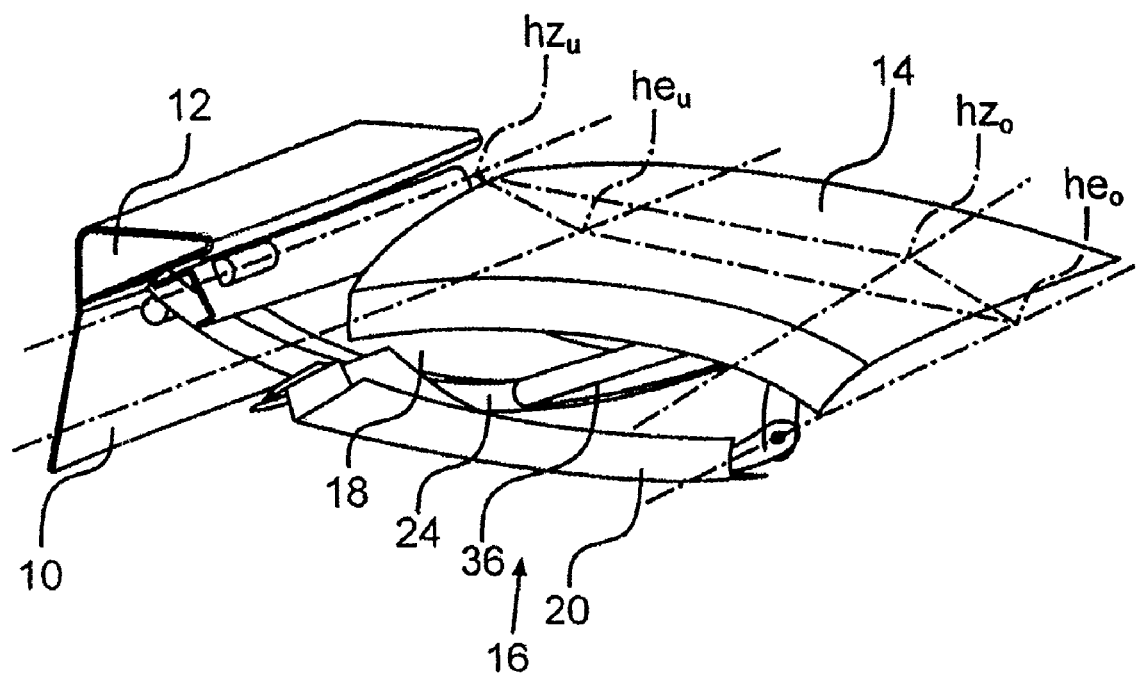
FIG. 5 is a schematic perspective view of the folding roof according to FIGS. 1 to 4, the folding roof likewise being illustrated in its storage position.

Looking at FIG. 4, together with FIG. 5, which shows the folding roof in the storage position in a schematic perspective view obliquely from the rear left, it can be seen that the upper roof part 14 comes to lie approximately overlapping with the roof pillars 20 of the rear roof part 16. The rear window 18, which is arranged at a distance in front of the upper roof part 14 or the roof pillars 20, comes to lie above a motor vehicle fuel tank (not illustrated further), which, for its part, adjoins the rear side of the rear partition 10.

Towards the outer side, the rear window 18 or its rear window frame 22 comprises an encircling seal (not illustrated further) with which it can be sealed off from the upper roof part 14 and the roof pillars 20 of the rear roof part 16 when the folding roof is closed.

Overall, it can be seen from the figures that, in the present case, a hardtop folding roof is provided, in which one of the two link mechanisms 34 is arranged on each outer side of the motor vehicle. The link mechanism includes two main links 24, 40 which interact with each other in the manner of a parallelogram in the region of the coupling points $he_o$, $he_u$, $hz_o$, $hz_u$ and via which the folding roof can be transferred from the closed position into the storage position and back. In this case, the respectively rear, first main link 40 of each of the two link mechanisms 34 is formed fixedly or integrally with the associated roof pillar 20 of the rear roof part 16 and is coupled on the upper side to the upper roof part 14. The respectively second main links 24 of each of the two link mechanisms 34 are assigned to the rear window frame 22 such that the rear window 18 or its rear window frame 22 overall takes on the function of the further main link of each link mechanism 34. This results in a particularly simple refinement of the folding roof. Furthermore, the coupling of the two second main links 24 at a considerable distance in front of the end edge 38 of the upper roof part 14 makes it possible for the rear window 18 to come to lie at a length distance in front of the upper roof part 14 in the storage position, thus resulting overall in the extremely space-saving arrangement of the upper roof part 14 in relation to the rear window 18 within the roof storage space.

The invention claimed is:

1. A hardtop folding roof for an open motor vehicle, comprising:
   an upper roof part,
   a rear roof part having a rear window, and,
   respective lateral link mechanisms by which the roof parts can be transferred from a closed position into a storage position,
   wherein each link mechanism comprises two main links, a first main link of said two main links being assigned to an associated roof pillar of the rear roof part, and a second main link of said two main links being coupled at least indirectly to the upper roof part at a distance in front of the associated first main link,
   wherein a rear window holder of the rear window is movable relative to the roof pillar during transfer of the folding roof,
   wherein the second main link of each link mechanism is assigned to the rear window holder of the rear window, and
   wherein a transverse element extending between the two main links forms at least part of a rear shelf supporting arrangement.

2. The hardtop folding roof as claimed in claim 1, wherein the second main links laterally bound the rear window and are connected to each other via at least one transverse connection at least partly defined by the transverse element.

3. The hardtop folding roof as claimed in claim 1, wherein the second main links protrude with respective upper link arms in relation to an upper end of the rear window.

4. The hardtop folding roof as claimed in claim 3, wherein the second main links are coupled by their respective upper link arms at a considerable distance in front of a rear end edge of the upper roof part.

5. The hardtop folding roof as claimed in claim 2, wherein the rear window holder is designed as a rear window frame, and wherein the second main links are connected to each other at upper and lower ends of the rear window via respective transverse connections, at least one of which is at least partly defined by the transverse element.

6. The hardtop folding roof as claimed in claim 5, wherein, when the folding roof is closed, the rear window is designed to be height-adjustable along the rear window frame.

7. The hardtop folding roof as claimed in claim 5, further comprising an adjusting drive for height adjustment of the rear window arranged in a region of the rear window frame.

8. The hardtop folding roof as claimed in claim 5, wherein the transverse element at its rear, adjoins a transverse support on an upper side of a partition of the motor vehicle.

9. A hardtop folding roof for an open motor vehicle, comprising:
   an upper roof part,
   a rear roof part having a rear window, and
   respective lateral link mechanisms by which the roof parts can be transferred from a closed position into a storage position,
   wherein each link mechanism comprises two main links, a first main link of said two main links being assigned to an associated roof pillar of the rear roof part, and a second main link of said two main links being coupled at least indirectly to the upper roof part at a distance in front of the associated first main link,
   wherein a rear window holder of the rear window is movable relative to the roof pillar during transfer of the folding roof,
   wherein the second main link of each link mechanism is assigned to the rear window holder of the rear window, wherein the second main links laterally bound the rear window and are connected to each other via at least one transverse connection, wherein the rear window holder is designed as a rear window frame, and wherein the second main links are connected to each other at upper and lower ends of the rear window via respective transverse connections, wherein a lower transverse connection of the respective transverse connections has a transverse element which, at its rear, adjoins a transverse support on an upper side of a partition of the motor vehicle, and wherein the transverse element and the transverse support form a supporting arrangement for a rear parcel shelf.

10. The hardtop folding roof as claimed in claim 8, wherein, in its storage position, the rear window frame comes to lie with its lower end in a vicinity of the transverse support.

11. The hardtop folding roof as claimed in claim 5, wherein the rear window frame is sealable with respect to the upper roof part and the roof pillars of the rear roof part.

12. The hardtop folding roof as claimed in claim 1, wherein, in the storage position of the folding roof, the rear window comes to lie above a volume behind a partition delimiting an interior of the motor vehicle.

13. A hardtop folding roof for an open motor vehicle, comprising:
an upper roof part,
a rear roof part having a rear window, and
respective lateral link mechanisms by which the roof parts can be transferred from a closed position into a storage position, wherein each link mechanism comprises two main links, a first main link of said two main links being assigned to an associated roof pillar of the rear roof part, and a second main link of said two main links being coupled at least indirectly to the upper roof part at a distance in front of the associated first main link, wherein a rear window holder of the rear window is movable relative to the roof pillar during transfer of the folding roof, wherein the second main link of each link mechanism is assigned to the rear window holder of the rear window, wherein, in the storage position of the folding roof, the rear window comes to lie above a fuel tank of the motor vehicle, and wherein the upper roof part and the roof pillars of the rear roof part come to lie with their front ends at a distance behind the front end of the rear window.

14. The hardtop folding roof as claimed in claim 1, wherein each of the lateral link mechanisms comprises a main bearing, via which respectively associated first and second main links are mounted pivotably on the body of the motor vehicle.

* * * * *